United States Patent Office 3,632,668
Patented Jan. 4, 1972

3,632,668
UNSATURATED POLYESTER COMPOSITIONS
THICKENED BY A DI-SUBSTITUTED UREA
Layton F. Kinney, 905–D W. North Ave., Villa Park, Ill. 60181, and Roy J. Betty, 8239 S. Troy, Chicago, Ill. 60652
No Drawing. Filed Feb. 20, 1968, Ser. No. 706,791
Int. Cl. C08f 21/02
U.S. Cl. 260—864
6 Claims

ABSTRACT OF THE DISCLOSURE

Thickened polyester compositions comprising unsaturated polyester and unsaturated monomer obtained by the in situ reaction of a long chain amine and polyisocyanate to form urea. Such compositions are useful to produce high build coatings as in the production of boats and similar large structures of cured polyesters.

BACKGROUND OF INVENTION

It has been found desirable to use thickened polyester compositions when high build coatings are desired. Particularly suitable are thixotropic compositions which may be readily applied, but resist sagging and running upon application. Thixotropy is a phenomenon for which the exact mechanism of functioning has not been satisfactorily explained, resulting in compositions becoming less viscous when subjected to high shear forces and then returning to their normal viscous condition when they are allowed to stand.

High build polyester compositions find general application, especially in the manufacture of products by the hand lay-up open mold method, such as in the production of boats, water tanks and similar large structures. Thickened polyester compositions are also suitable for rigid gel coat applications such as surfacing of boats, reinforced plastic parts, and the like.

Thickened polyester compositions have in the past been obtained by addition of various thickening agents. However, many such agents have imparted such undesirable properties as varying viscosity and thixotropy after storage times of three to six months. Further, it is desirable that the thickening agent for not affect the curing of the unsaturated polyester and unsaturated monomer when using curing agents such as methylethyl ketone peroxide and benzoyl peroxide.

Previous methods for thickening polyester compositions have been by use of pigments, clays, and various silica preparations. One of the more frequently used thixotropic agents has been fumed colloidal silica, prepared in a hot gaseous environment by vapor-phase hydrolysis of a silicon compound, and characterized by extremely great surface area and a high degree of particle separation.

SUMMARY OF THE INVENTION

This invention is directed toward a composition which obviates many of the disadvantages experienced with prior art materials. This invention provides a composition which may be used as a high build coating and may be readily formulated without requiring elaborate mixing equipment. The thickened polyester compositions of our invention comprise an unsaturated polyester, an unsaturated monomer selected from the group consisting of vinyl, acrylic and allylic monomers, and a minor proportion of urea produced by the in situ reaction of an aliphatic primary amine and an aromatic polyisocyanate.

To form the urea in situ, aliphatic amino compounds are preferred amine reactants, particularly amines containin an aliphatic group of from about 6 to 22 carbon atoms. Such aliphatic groups may be a branched or straight hydrocarbon chain, cyclic, an arylalkyl group, and saturated or unsaturated. Primary mono-amines selected from the group consisting of N-normal-alkyl, N-normal-alkenyl and N-secondary-alkyl amines having from about 6 to 22 carbon atoms are preferred. Suitable normal amines include octylamine, dodecylamine, octadecylamine, oleylamine, docosylamine, and amines produced from acids derived from natural sources such as coco, tallow and the like.

N-secondary-alkyl amines having from 6 to 22 carbon atoms are especially preferred. N-secondary-alkyl amines are very useful due to their low melting points resulting in amines having fluid properties under field conditions. Suitable N-secondary-alkyl amines include those which may be produced from olefins as described in U.S. Pat. 3,338,967, Aug. 29, 1967. These amines are described by the formula

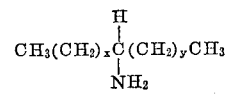

wherein $x$ and $y$ are integers having a sum from about 3 to 19. One preferred sub-class is N-secondary-alkyl amines having from about 7 to 20 carbon atoms. These amines are usually mixtures of hydrocarbon chain length depending upon the particular olefin cut utilized in their production. Amines of chain lengths $C_{7-9}$, $C_{9-11}$, $C_{11-14}$, and $C_{15-20}$ are commercially available and especially useful in our invention. Mixtures of amines may be used.

Polyisocyanates suitable for forming the composition of this invention include aromatic isocyanates which react with an amine to form urea. It is preferred to use di-functional isocyanates, or pre-polymers thereof, including toluene diisocyanate which is especially preferred. Commercial toluene diisocyanate which is generally a mixture of tolyl 2,4- and tolyl 2,6- has been used with excellent results.

Polyesters suitable for the composition of our invention include polyesters containing unsaturation. Such polyesters are well known in the art. Unsaturation in the polyester is usually obtained from unsaturation in the acid or anhydride component from which the polyester is formed, but may be derived from unsaturation in the alcohol component. It has been found that to obtain desired properties of strength, flexability and unsaturation, it is generally suitable to use a blend of acids and/or anhydrides. Suitable acids and anhydrides include aromatic dibasic acids or anhydrides such as phthalic, adipic, isophthalic, terephthalic and aliphatic dibasic acids such as maleic and fumaric acids. Suitable alcohol components of the polyester include polyhydroxy compounds, usually diols such as ethylene glycol, propylene glycol, diethylene glycol, and dipropylene glycol, and triols such as trimethylolpropane. Mixtures of polyols may be used. The polyesters are formed by reaction of the acid and alcohol reactants until an acid value of less than 50 is obtained.

A representative polyester for use in our invention contains a mixture of phthalic, adipic and maleic acids and/or anhydrides reacted with ethylene glycol and having an acid value of less than 50.

Unsaturated monomers suitable for use in the composition of our invention include the monomers selected from the group consisting of vinyl, acrylic and allylic monomers and their substituted derivatives. Specific compounds which are especially useful as unsaturated monomers include styrene, ring-substituted styrene such as dichlorostyrene, alpha-methyl styrene, ring-substituted alpha-methyl styrene, vinyl toluene, di-vinyl benzene, methyl methacrylate, ethylacrylate, acrylonitrile, diallyl phthalate and triallyl cyanurate. Commercially available compounds preferred in our composition include those selected from the group consisting of styrene, vinyl toluene, alpha-methyl styrene, di-vinyl benzene, and methyl methacrylate. Vinyl monomers, especially styrene, have been found to be particularly preferred unsaturated monomers. Mixtures of monomers may be used.

The unsaturated monomer component is a solvent for the unsaturated polyester. The unsaturated monomer may also react with the unsaturated polyester in the presence of suitable catalysts well known in the art, such as peroxide catalysts, including conventionally used methyl ethyl ketone peroxide and benzoyl peroxide.

The compositions of our invention are formulated by mixing from about 10 to 50 weight percent unsaturated monomer, based upon the total composition, with one or more of the unsaturated polyesters. 20 to 40 weight percent unsaturated monomer is preferred. The in situ urea may be formed by the simple mixing of the amine and polyisocyanate in the unsaturated polyester-monomer composition. To form the urea it is suitable to use from less than the stoichiometric amount of amine and isocyanate to about 40 percent excess of amine. It is preferred to add the amine in a mole ratio of amine to isocyanate of from about 1:1 to 2.8:1. More ratios of about 2:1 to 2.8:1 are especially suitable.

Suitable compositions according to this invention may be formulated using from about 0.1 to 5 weight percent urea concentration in the resin. Preferred compositions contain from about 1 to 3 weight percent urea. The optimum concentration of urea will vary depending upon the type of resins used and the particular thickening properties desired.

The composition of our invention may be cured by use of many catalysts well known in the art for promotion of the reaction of unsaturated polyester and unsaturated vinyl type monomers, such as methyl ethyl ketone peroxide and benzoyl peroxide. The urea formed in situ does not appear to lengthen the curing time. The cured polyester composition comprises the reaction product of unsaturated polyester and unsaturated monomer selected from the group consisting of vinyl, acrylic and allylic monomers and a minor proportion of urea produced by the in situ reaction of aliphatic primary amine having from about 6 to 22 carbon atoms and aromatic polyisocyanate.

Compositions may be formulated according to this invention to a wide range of thixotropic viscosities which do not lose their viscosity upon standing for several months. The compositions of this invention may be formulated in batches by simple mixing in tanks, and stored for use as desired. Such compositions are stable over wide temperature ranges and over long periods of time. Further, the compositions of this invention exhibit desirable thixotropic properties which enable them to be pumped into narrow spacings while furnishing sufficient body to provide high build coatings.

It has also been found that the unsaturated monomer itself, such as styrene, may be thickened to a gel by the in situ formation of from about 1 to 4 weight percent urea.

The following examples are presented to illustrate the present invention.

EXAMPLE I

To 291 grams of styrene was added 6.18 grams of N-sec-alkyl($C_{11-14}$) primary amine with stirring. Then 2.81 grams of toluene diisocyanate was added with mixing until a gel formed. The mole ratio of amine to diisocyanate was 2:1 and urea was formed in situ in an amount of 3 weight percent, based upon the total weight of the composition. A thick stable gel was formed.

EXAMPLE II

To an unsaturated monomer-mixed maleic-phthalic glycol polyester containing some saturated dibasic acid, (marketed under the trademark Laminac Polyester Resin 4110 by American Cyanamid Company, a rigid, promoted, air-cured type resin containing about 30 percent styrene monomer, exhibiting viscosity of 4 to 6 poises at 77° F.) was added N-sec-alkyl($C_{7-9}$) primary amine with stirring. Toluene diisocyanate was then added with stirring until the formation of a gel was observed. A soft firm gel was formed. The mole ratio of amine to toluene diisocyanate was 2:1, and the concentration of urea formed was 2 weight percent, based upon the weight of the total composition. A thixotropic thickened polyester composition resulted. The appearance of the composition was the same after standing in a static condition. The viscosity was obtained by measurement by a Brookfield Viscometer and the results are shown in Table I at 25° C. and revolutions per minute as noted. The thixotropic properties of the gel are readily apparent from the decrease in viscosity in higher revolutions per minute as shown in Table I.

TABLE I

| R.p.m.: | Brookfield viscosity in centipoises at 25° C. |
|---|---|
| 2 | 2300 |
| 4 | 1920 |
| 10 | 1512 |
| 20 | 1376 |

EXAMPLE III

The same procedure as set forth in Example II was followed substituting N-sec-alkyl($C_{11-14}$) primary amine for the N-sec-alkyl($C_{7-9}$) primary amine used in Example II. The other components of the composition were identical. The Brookfield viscosities were measured at 25° C. and are shown in Table II.

TABLE II

| R.m.p.: | Brookfield viscosity in centipoises at 25° C. |
|---|---|
| 2 | 3320 |
| 4 | 2600 |
| 10 | 2000 |
| 20 | 1720 |

EXAMPLE IV

To the composition as prepared in Example II was added 1 percent methyl ethyl ketone peroxide curing agent. The time to cure such composition was compared to the time for curing the same polyester composition using the same curing agent, but without the in situ formed urea. The curing time for the two samples was found to be substantially the same, 17 to 18 minutes with a temperature of 85° F. at the start of the test.

EXAMPLE V

The same procedure as set forth in Example II was followed substituting coco[1] primary amine for the N-sec-alkyl($_{7-9}$) primary amine used in Example II. The other ---
[1] The coco group is derived from coconut oil and is a mixture of saturated and unsaturated hydrocarbon chains from $C_8$ to $C_{18}$, predominately dodecyl.

components of the composition were identical. The Brookfield viscosities were measured and are shown in Table III.

TABLE III

| R.p.m.s: | Brookfield viscosity in centipoises at 25° C. |
|---|---|
| 2 | 1550 |
| 4 | 1475 |
| 10 | 1400 |
| 20 | 1350 |

EXAMPLE VI

The same procedure as set forth in Example II was followed substituting tallow [2] primary amine for the N-sec alkyl$_{(7-9)}$ primary amine used in Example II. The other components of the composition were identical. The Brookfield viscosities were measured and are shown in Table IV.

TABLE IV

| R.p.m.s: | Brookfield viscosity in centipoises at 25° C. |
|---|---|
| 2 | 1480 |
| 4 | 1270 |
| 10 | 1112 |
| 20 | 1014 |

While in the foregoing specification this invention has been described in relation to certain prefered embodiments thereof, and many details have been set forth for purpose of illustration, it will be apparent to those skilled in the art that the invention is susceptible to additional embodiments and that certain of the details described herein can be varied considerably without departing from the basic principles of the invention.

---
[2] The tallow group is derived from tallow fatty acids and is a mixture of saturated and unsaturated hydrocarbon chains from $C_{14}$ to $C_{18}$, predominately oleyl.

We claim:
1. A thickened thixotropic polyester composition comprising about 50 to 90 weight percent, based upon the total composition, ethylenically unsaturated polyester formed by the reaction of dibasic acids with polyhydroxy alcohols; about 10 to 50 weight percent, based upon the total composition, unsaturated monomer selected from the group consisting of vinyl and allylic monomers and their substituted derivatives which are reactive with unsaturated polyesters; and about 0.1 to about 5 weight percent, based upon the total composition, of di-substituted urea produced by the in situ reaction of an aliphatic primary monoamine having about 6 to 22 carbon atoms in an aliphatic group attached to the amino nitrogen and an aromatic diisocyanate which reacts with said monoamine to form said di-substituted urea; said amine added to the mole ratio of amine to diisocyanate of from 2:1 to 2.8:1.

2. The composition of claim 1 wherein said monoamine is selected from the group consisting of N-normal-alkyl, N-normal-alkenyl, and N-secondary-alkyl amines having from about 6 to 22 carbon atoms.

3. The composition of claim 1 wherein said monoamine is N-secondary-alkyl primary amine.

4. The composition of claim 3 wherein said monomer is selected from the group consisting of styrene, vinyl toluene, diallyl phthalate, di-vinyl benzene, and methyl methacrylate.

5. The composition of claim 1 wherein said monomer is styrene, said urea is present in from 1 to 3 weight percent, said aliphatic primary mono-amine has the formula

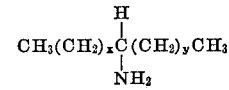

wherein $x$ and $y$ are integers having a sum from about 11 to 20, and said aromatic diisocyanate is toluene diisocyanate.

6. The composition of claim 1 wherein said polyester has an acid value less than 50.

References Cited

UNITED STATES PATENTS

| 2,621,116 | 12/1952 | Schmidt et al. | 260—75 |
| 2,801,990 | 8/1957 | Seeger et al. | 260—75 |
| 2,956,031 | 10/1960 | Khawam | 260—2.5 |
| 2,983,702 | 5/1961 | Little et al. | 260—75 X |
| 3,100,759 | 8/1963 | Boussu et al. | 260—77.5 |
| 2,820,020 | 1/1958 | Franko-Filipasic | 260—45.4 |
| 3,079,364 | 2/1963 | Schmidt | 260—45.4 |
| 3,288,735 | 11/1966 | Watanable et al. | 260—17.4 |
| 3,424,724 | 1/1969 | Nordstrom | 260—70 |

WILLIAM H. SHORT, Primary Examiner

R. J. KOCH, Assistant Examiner

U.S. Cl. X.R.

117—161 K; 260—93.5 R